3/12/85 XR 4,504,933

United States Patent [19]

Janney

[11] Patent Number: 4,504,933

[45] Date of Patent: Mar. 12, 1985

[54] APPARATUS AND METHOD FOR PRODUCING SOUND IMAGES DERIVED FROM THE MOVEMENT OF PEOPLE ALONG A WALKWAY

[76] Inventor: Christopher Janney, 34 Summit Ave, Somerville, Mass. 02143

[21] Appl. No.: 417,911

[22] Filed: Sep. 14, 1982

Related U.S. Application Data

[63] Continuation-in-part of Ser. No. 49,196, Jun. 18, 1979, abandoned.

[51] Int. Cl.[3] .......................... G08B 3/00; G01H 1/02

[52] U.S. Cl. ..................................... 367/197; 367/93; 381/105; 84/1.01; 84/DIG. 19; 340/815.21

[58] Field of Search .................. 367/198, 93, 197, 94; 84/1.01, 1.08, DIG. 19; 381/87, 105, 118, 61, 123, 124, 51-53; 340/384 E, 815.21

[56] References Cited

U.S. PATENT DOCUMENTS

| | | | |
|---|---|---|---|
| 3,509,288 | 4/1970 | Leventhal . | |
| 3,560,628 | 2/1971 | Plunkett et al. | 84/1.08 |
| 3,775,546 | 11/1973 | Honegger | 84/1.01 |
| 3,787,602 | 1/1974 | Okudaira | 84/DIG. 19 |
| 4,023,151 | 5/1977 | Markham . | |
| 4,326,276 | 4/1982 | Scott, Jr. | 84/1.01 |

*Primary Examiner*—Donald J. Yusko
*Attorney, Agent, or Firm*—Robert L. Slater, Jr.

[57] ABSTRACT

Apparatus and method for esthetic programmatic coordination of musical and spoken sounds in response to the movement and presence of one or more persons on a stairway or in a pedestrian walkway.

5 Claims, 3 Drawing Figures

APPARATUS AND METHOD FOR PRODUCING SOUND IMAGES DERIVED FROM THE MOVEMENT OF PEOPLE ALONG A WALKWAY

CROSS REFERENCE TO COPENDING APPLICATION

This application is a continuation-in-part of a copending parent application, Ser. No. 49,196 filed June 18, 1979 titled STAIRWAY HAVING COORDINATED SOUND MEANS and abandoned.

SUMMARY OF INVENTION

Briefly stated, my invention provides both an apparatus and a method. The apparatus of my invention is comprised of a plurality of sensing means, the sensing means being mounted in spaced relationship one to another along a pedestrian walkway, such as a stairway, a passageway or any architectural setting; a plurality of sound generating means, and a programmable circuit means having multiple input channels and multiple output channesl. The sensing means are connected respectively to individual input channels of the programmable circuit means. Output channels of the programmable circuit are connected, respectively to the various sound generating means and selectively actuate the sound generating means in preprogrammed response to movements of persons in relation to the sensing means.

The following drawings, specifications and claims provide a more complete description of my invention.

BACKGROUND OF INVENTION

Figure 1:
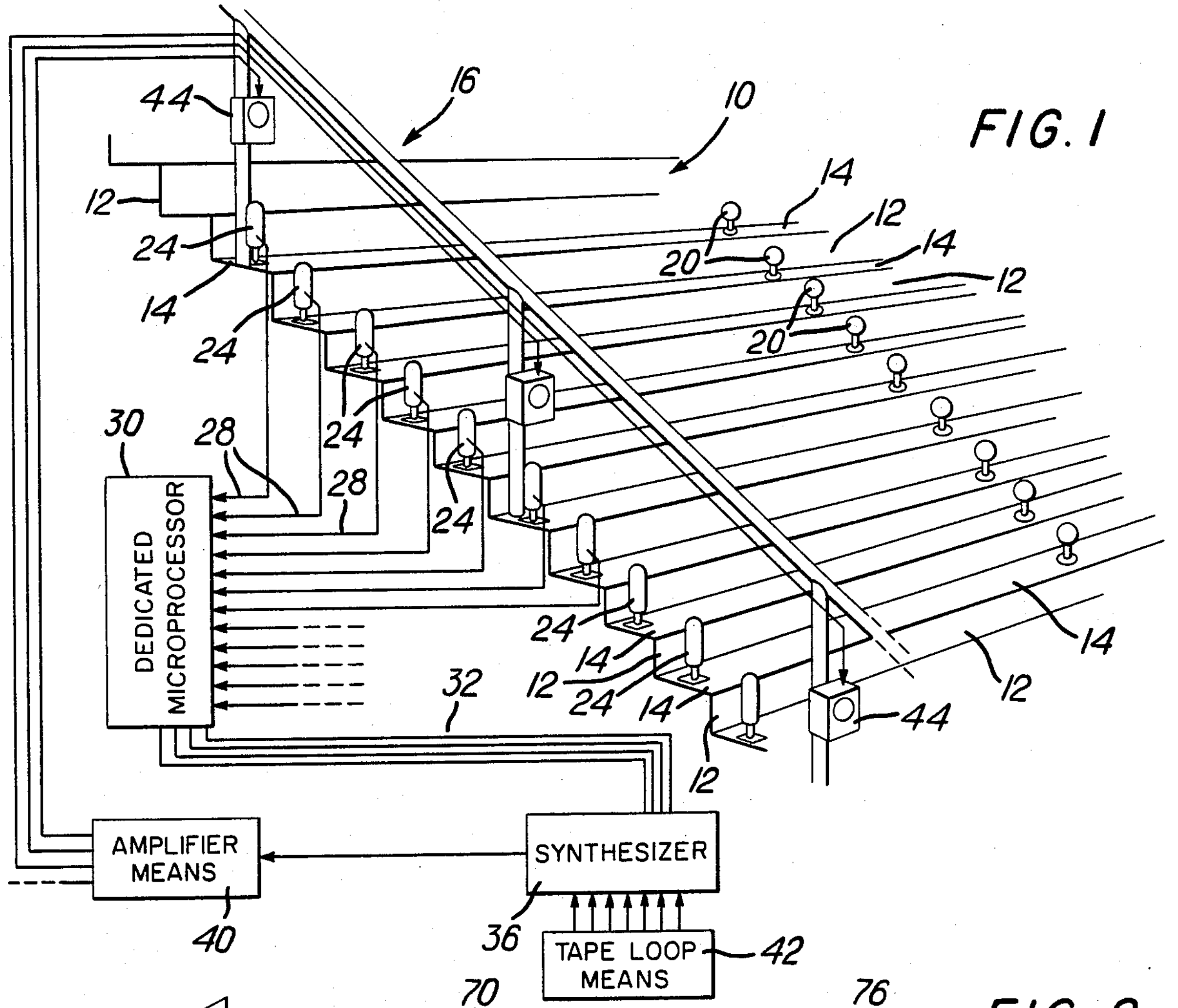
FIG. 1 is a combined perspective view and schematic of a preferred embodiment of my invention adapted to a stairway.

The present invention relates to apparatus and method for novel esthetic enhancement of stairways and pedestrian passageways.

Stairways and pedestrian walkways have long been esthetically enhanced with visually pleasing proportions and decorative, but static, embellishments. The stairway throughout the history of architecture has provided an object of special visual attention and often the central focus in architectural designs. Human activity having dramatic, religious and esthetic interest is often conducted or deliberately staged on stairways. This dramatic employment of the stairway may be noted in Mayan, Greco-Roman classic, and other cultures as well as in modern Western settings.

However, despite the historically long interest and attention given to the dramatic and esthetic potential of the stairway and elevated or inclined walkways, the design and esthetic enhancement of such structures has heretofore not progressed beyond conventional static decorative visual additions.

During recent times electronically reproduced music is sometimes added to the stairway or pedestrian passageway environment. Such repetitious musical additions, while often pleasant, do not relate to the visual or spacial environment associated with a stairway or passageway. Conventional musical passages reproduced within hearing of persons on a stairway is aggregative to static spacial environment, and does not interact with the architectural structure in the sense of the interaction between a person and his environment afforded by means of my invention.

A new dimension in the creation of esthetically pleasing and stimulating architectural environments is made possible by my invention. Peoples' movements on a stairway or along a pedestrian passageway may be translated into esthetically programmed mechanical, musical and spoken word sound images. By means of my inventive apparatus and method a pleasing and stimulating interaction between a person moving along a stairway or passageway may be translated into sound patterns. The programmed interactive sound patterns, through the use of my invention, relate the individual person's movements in a unique and an esthetic manner to the stairway or other structure upon which he is moving. In addition, the sound images so created can relate one person to other persons moving upon or present on a stairway or in a passageway. Thus, through the function of my invention a new and novel dimension in a person's sense of relationship to his environment and to other persons also in that environment may be created.

Accordingly, one object of my invention is to provide an automated sound image environment interactively related to a person or several persons movements upon or through an architectural setting.

Another object of my invention is to provide apparatus and method for interactively relating a person's movements along a stairway or in a pedestrian passageway to esthetically programmed sound images.

Still another object of my invention is to provide apparatus and method of sensing the presence and progressive movement of one or more persons along a stairway or pedestrian walkway and translating their respective movements into esthetically programmed mechanical, musical and spoken word sound images.

These and other objects and advantages of my invention will be apparent from the following specifications and draw- ings.

DETAILED DESCRIPTION OF INVENTION

Referring now to the illustrations, FIG. 1 shows a combined perspective view and schematic diagram of a preferred embodiment of my invention. The illustrated embodiment is mounted on a stairway 10. The stairway is comprised of a plurality of risers 12 and landings 14, respectively. A handrail 16 is mounted longitudinally at one side of the stairway.

A plurality of electromagnetic radiation emitters 20 are mounted each one singly at the end of and on each respective stair landing 14. A plurality of electromagnetic radiation sensors 24 are mounted one to each stair landing at a spaced distance from the respective emitters 20. The described arrangement is readily visualized by reference to the illustration. A person moving along the stairway will progressively interrupt the emitted beams and alter the state of the respective corresponding sensors.

My invention contemplates in various embodiments the use of a wide selection of radiant energy sources and appropriately matched sensors. For instance, visible band light sources and photoelectric sensors are readily available and adaptable for use in my invention. In order that the sensor action be not visible to the person interrupting the radiated beam, and which will not be effected by ambiant light changes, infrared radiation may be used with infrared sensor means. The illustrated embodiment of FIG. 1 utilize infrared emitters 20 and infrared beam detectors 24. Other portions of the electromagnetic spectrum, however, are suitable for adaptation to sensors for use in my invention.

The sensors 24 in FIG. 1 are connected respectively to a plurality of input channels 28 of a programmable microprocessor circuit 30. Output channels 32 of the microprocessor circuit are connected to a sound synthesizer circuit 36. The output of the synthesizer 36 is shown connected to audio amplifier means 40. Sound generating sources such as for instance tape loop means 42 are connected to input channels in the synthesizer 36. A plurality of sound emitting speakers 44 are mounted in a spaced array along the stairway. The output of the amplifier means 40 is connected to individual speakers 44.

It amy be readily visualized that numerous variations in the circuit arrangements all within the intended scope of my invention may be devised between the output of the programmable microprocessor circuit 30 and the various mounted speakers 44. For instance, a variety of sound source may be drawn upon and appropriate signals selectively fed into the synthesizer circuit 36 to generate mechanical sound effects, selections of musical passages and spoken words or any combination of these. A more detailed description of a specific embodiment and the functions of the various electronic components of my invention is described below.

The individual speakers 44 may be energized to provide one sound image throughout the stairway. In contrast each speaker may be separately connected through the amplifier means 40 to the synthesizer 40 and energized to provide a unique sound pattern or image that progresses along the stairway with the person whose movements are being translated into the sound image. Thus, two or more persons will sense one another by means of two readily distinguishable sound images as each person moves about the stairway. The manner by which the sound images are created and projected into the environment is described in greater detail in connection with the description of FIG. 3 below.

Figure 2:
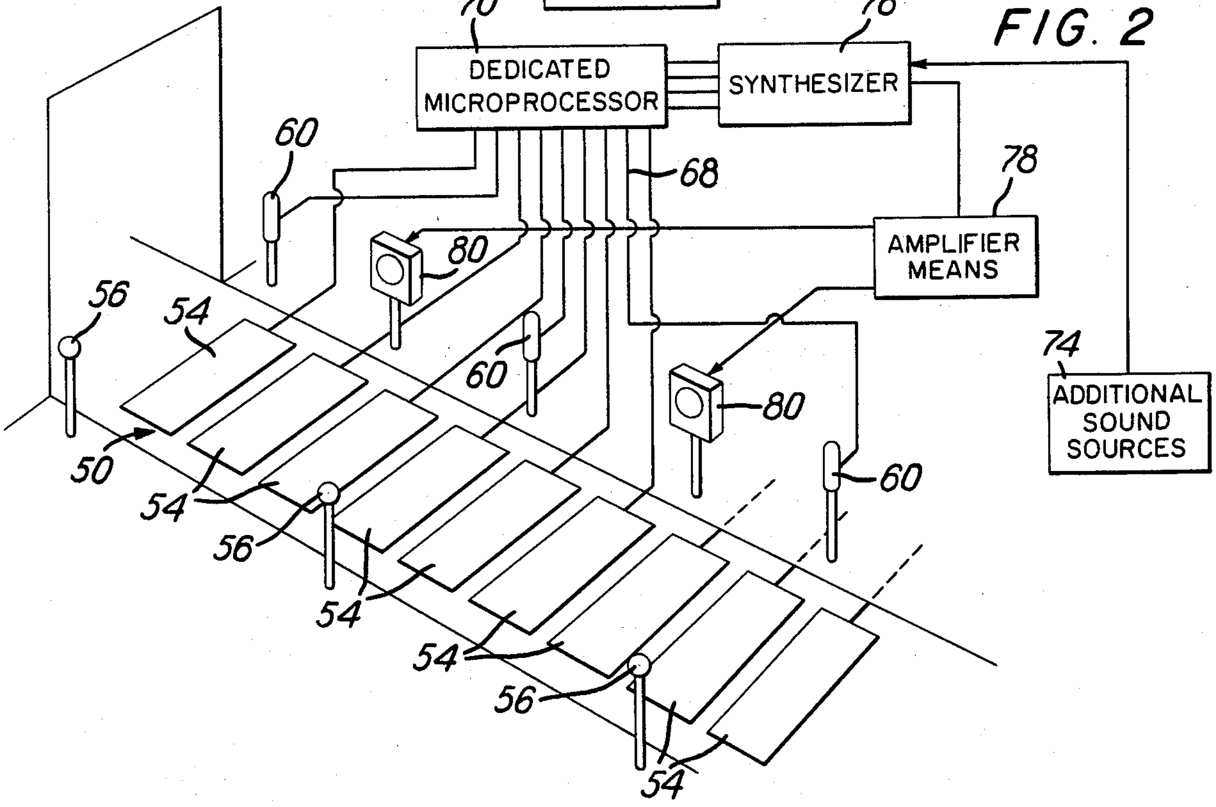
FIG. 2 is a variation of the embodiment of my invention illustrated in FIG. 1 adapted to a pedestrian passageway.

A second adaptation of my invention for utilization on a level or inclined walkway is illustrated in FIG. 2. A pedestrian walkway 50 is provided with pressure sensitive treadles 54 placed at intervals in spaced relationship one to another along the walkway 50. In addition to, and for simultaneous use with, the treadles 54, other sensing means are also employed in the FIG. 2 example. Electromagnetic radiation sources 56 such as radiate near infrared beam emitters are place respectively on one side of the walkway opposite radiation sensor devices 60 mounted, respectively, along the opposite side of the walkway. The sources 56 and corresponding respective sensors 60 are mounted at spaced intervals from one another and at a height above the walkway.

The pressure sensitive treadles 54 may be selected to require different amounts of weight to activate. Thus, a heavy adult person moving along the walkway, could be readily distinguished from a light-weight person or child moving on the walkway. Similarly the radiation energy sensors 60 positioned at different heights along the walkway would make possible sensing the height of a person, as being tall or short moving between the radiate energy beam sources 56 and the corresponding respective sensor 60.

Each of the sensors, treadles 54 and light sensors 60 respectively, are connected to an input channels 68 of the programmable microprocessor circuit 70. Sound generating sources 74 connect to the input of a synthesizer circuit 76. The microprocessor circuit output is connected to still other input channesl of the synthesizer circuit 76. The synthesizer output is fed into audio amplifier means 78 which in turn selectively energize a plurality of sound emitters or speakers 80. The speakers are mounted in spaced array along and within hearing range of persons moving along the walkway 50.

The speakers 80 can all be energized with one signal from the amplifier means 78. Alternatively, each speaker may be separately energized with signals from the amplifier means 78 progressively shifted from one to the next speaker responsive to the movements of one person as that person traverses the walkway. Thus, the sound image of a person moving along the walkway may progressively be shifted from one to another speaker apace with the individual person as he moves along. These and numerous alternatively programmed interactive sound images may be created by means of my invention.

Figure 3:
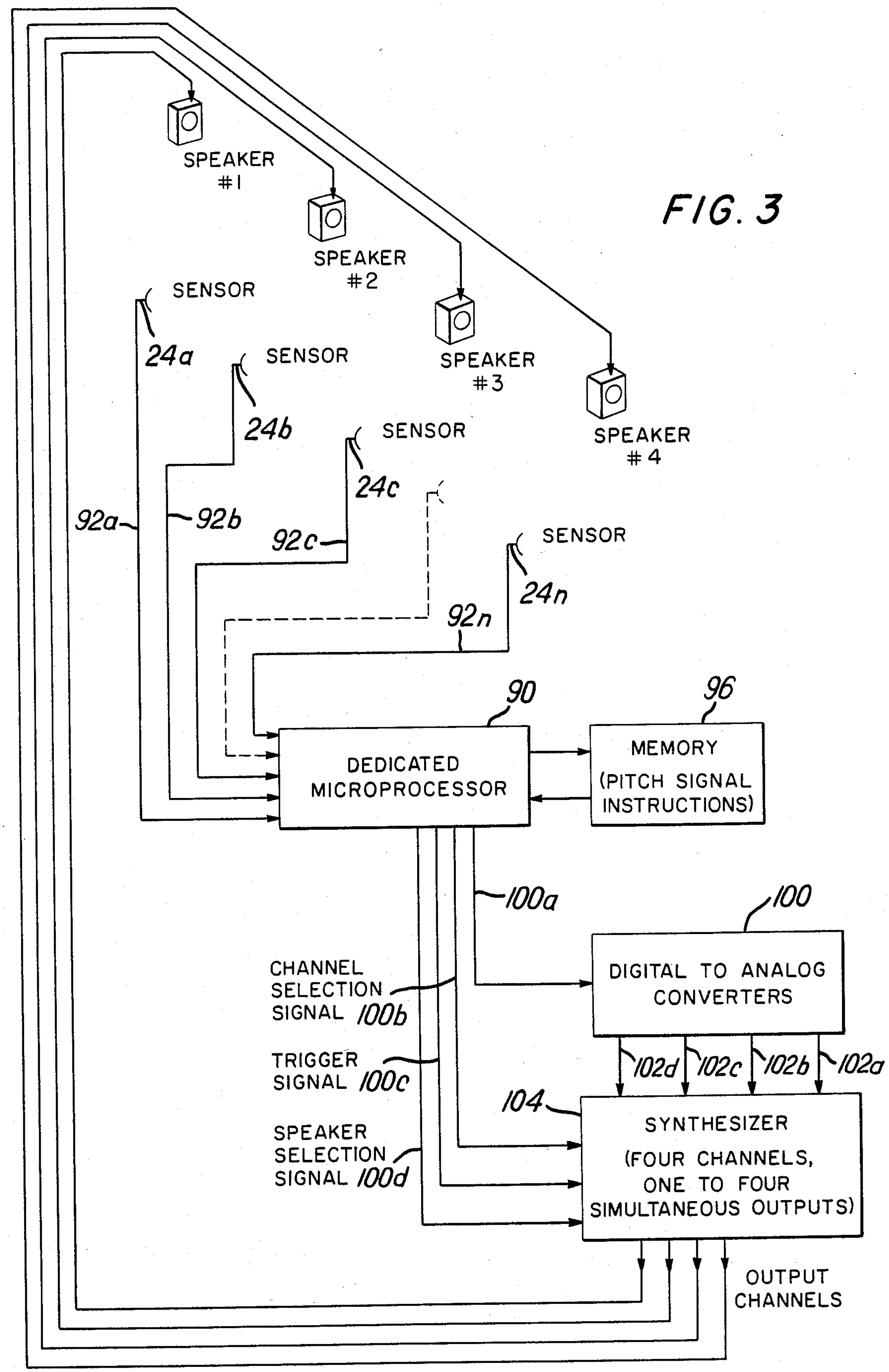
FIG. 3 is a more detailed schematic illustration of the embodiments of my invention illustrated in FIGS. 1 and 2.

Referring now to FIG. 3 which is a more detailed schematic drawing illustrating the functional relationships between the electronic components of the embodiment of my invention described for example in FIG. 1.

The dedicated microprocessor circuit 90 in FIG. 3, or at reference FIGS. 30 and 70 in FIGS. 1 and 2, respectively, may be selected from any one of a number of commercially available advanced interactive microprocessor circuits. Rockwell International AIM 65 programmable device is such a programmable microprocessor circuit readily adapted to my inventory. Microprocessor circuit 90 has 16 input channels and 8 output channels.

Sensors *24a, 24b–24n;* as shown in Figures as reference 24 and FIG. 3 are each respectively connected to one input channel *92a, 92b*–and *92n* of the synthesizer 90. Each input channel senses the status of the respective sensors *24s, 24b, 24c–24n.*

Upon the first sensor *24a* changing state, that is sensing the presence of a person, the microprocessor circuit, by previous program definition, interrogates a random access memory device or means 96 to assign a pitch frequency to the sound image which will be associated with the passage of a person first detected by sensor *24a.* The random access memory is equipped with serially listed pitch frequencies, each described in eight bit code messages. The memory 92 upon interrogration responds with an assigned pitch frequency message. Upon the second person interrupting a changing the state of sensor *24a* a second interrogation of the memory will be made and a second pitch frequency will then be assigned to the second sound image then being formed. The memory 92 may typically store ten separate pitch frequency instruments to be used serially one after the other. The series would normally be repeated after the tenth interogation.

In the embodiment shown in FIG. 3 and FIG. 1 at reference numberal 32 I have utilized four microprocessor output channels. These output channels shown at *100a, 100b, 100c* and *100d* respectively are connected as shown in FIG. 3 to a digital to analog converters 100, and to three inputs of the sound synthesizer 104.

The digital to analog converter 100 is an eight bit data device which will receive in its input an eight bit digital code message and respond thereto with a fixed voltage signal at its output as at 102*a,* 102*b,* 102*c,* or 102*d.* The microprocessor or 90 transmits via output channel 100*a,* its pitch frequency obtained from interrogating the memory 96 which message was assigned to the first sound image.

The synthesizer 104 is a standard multiple channel audio synthesizer device such as commercially available from Oberheim, Moog, or any of several other manufacturers. The audo synthesizer selected for the presently described embodiment has four separate simultaneous channels. Each synthesizer channel will function simultaneously but separately from the other channels. Each respective synthesizer channel may be preset to exhibit a particular "voice" or timbre and sound envelope in its output audio signal. Thus, for example, the first sound image may be assigned the "voice" of a simulated piano, the second sound image the "voice" of a simulated tuba, and the third sound image the simulated "voice" of a flute. The reader will now appreciate the great variety of audio and dramatic effects which my method and apparatus can thus provide.

The microprossessor 90 through its output leads 100*a,* 100*b,* 100*c* and 100*d* communicates the pitch frequency information assigned to a given sound image to the Digital to Analog Converter 100 which in turn provides an analog voltage signal at one output i.e., 100*a,* corresponding to that assigned to the given sound image. The microprocessor simultaneouly selects one channel in the synthesizer, to which it assigns the given "sound image." The synthesizer utilizing an assigned pitch frequency in combination with a preset "voice" characteristic of that synthesizer channel generate a sound readily identified with a given "sound image." It may also be appreciate by the reader that by assigning, for instance, ten different pitch frequencies each to a different "sound image," and combining these separate "sound image" pitches respectively with one of our "voices" associated each respectively with one channel in the synthesizer, a substantial number of separate and distinguishable sound images may be generated and utilized all more or less simultaneously and overlapping one with another in the same time period.

The microprocessor 90 in addition to the above described function selects the speaker or speakers to which the synthesizer output signals will be directed and transmits the speaker selection information via lead 100*d* to the synthesizer. Thus, the synthesizer audio signal may be programmed to shift its audio output signal from speaker 1 to speaker 2 to speaker 3 and accordingly, shift the radiation of a sound image along the walkway or stairway in a manner which will be preceived to follow the person generating the input by passing before the sensors 24*a,* 24*b,* etc.

From the foregoing description of the structure and function of a particular embodiment of my invention, it is readily seen that a variety of different arrangements to create different sound image effects may be constructed and adopted from the elements and method of my invention for use in various architectural settings, all of which different configurations and programmable effects are within the scope and intent of my invention. The foregoing specification and description of particular embodiments of my invention are intended as only illustrative, the scope of my invention is set forth in the following claims.

I claim:

1. An apparatus for translating into esthetically programmed sound images the movements of one or more persons moving along an architecturally defined walkway comprised of a plurality of sensing means, the sensing means being mounted in spaced relationship one to another along the walkway, a plurality of sound emitting devices, the devices being mounted in spaced-array along the walkway, sound generating and amplifying means and a programmable circuit means having multiple input channels and multiple output channels, the individual sensing means being connected each respectively, to one input channel of the programmable circuit means, the sound emitting and generating means being connected, each respectively, to one output channel of the programmable circuit means, whereby the movements of one or more persons along the walkway may be detected by the sensors and through the action of the programable circuit means selectively actuating the sound generating means causing preprogrammed sound to be emitted at the sound emitting means mounted along the walkway therewith creating a preprogrammed sound image in response to each person's presence and movements along the walkway.

2. The apparatus of claim 1 wherein the sensing means are comprised in combination of infrared light beam emitter and an infrared sensor device, the emitter being mounted to project its beam transverse of the walkway and a spaced distance from the sensor device whereby persons moving along the walkway intercept the respective infrared beams altering respectively the state of the various sensor devices and the signals derived therefrom.

3. The apparatus of claim 1 wherein the sensor means are comprised of pressure sensitive treadle and in combination light beam emitters and light sensor devices, the treadle sensor devices and light beam sensors being placed upon and along the walkway in spaced relationships one to the others, whereby persons moving along a walkway having different physical characteristics, as for instance, height and weight will be distinguished by the sensors and the programmable circuit and in turn, different sound images will be created in response to movements of people having different physical characteristics.

4. An apparatus for translating into sound images the movements of one or more persons on a stairway comprised of a plurality of electromagnetic radiation beam emitters and a plurality of electronic radiant beam sensors, the emitters being mounted one to each stair and the sensors being mounted in optically-spaced relationship on each respective stair to the respective emitters, a plurality of sound emitters, the sound emitters being mounted in spaced relationship along the stairway, a multiple input channel and multiple output channel programmable circuit means, and sound generating means, the radiant beam sensors being connected, each respectively, to one input channel of the circuit means, the sound generating means and emitters being connected to and selectively activated, respectively, by signals derived from the respective output channels of the programmable circuit means, whereby sound images may be created and auditably radiated along the stairway in coordinated programmed response to the movements of one or more persons traversing the stairway.

5. A method for interactively translating the movements of one or more persons on a pedestrian walkways or stairway into coordinated sound images comprised of sensing the progressive movements of a person or persons by means of electrically responsive sensor devices mounted in spaced relationship one to another along the walkway, feeding the sensor signals, respectively, into individual input channels of a multiple-input channel, multiple-output channel programmable circuit, and actuating selectively by means of electrical signals derived from the respective output channels of the programmable circuit, a plurality of sound generating and sound emitting means, the sound emitting means being mounted in spaced relationship one to another along the walkway, whereby preprogrammed mechanical, musical and spoken word sound images may be emitted selectively along a walkway in aesthetically coordinated response to one or more person's movements along the walkway or stairway.

* * * * *